(12) United States Patent
Ackaret

(10) Patent No.: US 6,799,297 B2
(45) Date of Patent: Sep. 28, 2004

(54) FORM PRINTING SOLUTIONS WEB SERVER USING A JAVA VENDING MACHINE FOR PULLING A JETSEND FORM PRINT JOB FROM A SERVER AND OUTPUTTING TO A DEVICE

(75) Inventor: Gary R. Ackaret, Meridian, ID (US)

(73) Assignee: Hewlett-Packard Development Company, LP., Houston, TX (US)

( * ) Notice: Subject to any disclaimer, the term of this patent is extended or adjusted under 35 U.S.C. 154(b) by 0 days.

(21) Appl. No.: 09/310,073

(22) Filed: May 10, 1999

(65) Prior Publication Data
US 2003/0088828 A1 May 8, 2003

(51) Int. Cl.[7] ................................................ G06F 3/12
(52) U.S. Cl. .................... 715/505; 715/506; 715/513; 709/203; 358/1.1; 358/1.15
(58) Field of Search ...................... 715/505–506, 715/507, 513, 501.1; 709/203, 311; 358/1.1, 1.15

(56) References Cited

U.S. PATENT DOCUMENTS

| | | | | |
|---|---|---|---|---|
| 5,701,423 A | * | 12/1997 | Crozier | 345/762 |
| 5,704,029 A | * | 12/1997 | Wright, Jr. | 345/173 |
| 5,734,835 A | | 3/1998 | Selker | 709/249 |
| 5,737,619 A | | 4/1998 | Judson | 707/500 |
| 5,745,754 A | | 4/1998 | Lagarde et al. | 707/104.1 |
| 5,752,246 A | | 5/1998 | Rogers et al. | 707/10 |
| 5,761,656 A | | 6/1998 | Ben-Shachar | 707/4 |
| 6,021,429 A | * | 2/2000 | Danknick | 709/208 |
| 6,041,309 A | * | 3/2000 | Laor | 235/379 |
| 6,065,120 A | * | 5/2000 | Laursen et al. | 705/27 |
| 6,243,711 B1 | * | 6/2001 | Wu et al. | 707/104.1 |
| 6,292,657 B1 | * | 9/2001 | Laursen et al. | 340/7.2 |
| 6,292,833 B1 | * | 9/2001 | Liao et al. | 709/219 |
| 6,298,164 B1 | * | 10/2001 | Suzuki et al. | 358/1.15 |
| 6,317,831 B1 | * | 11/2001 | King | 380/223 |
| 6,334,117 B1 | * | 12/2001 | Covert et al. | 235/379 |
| 6,421,729 B1 | * | 7/2002 | Paltenghe et al. | 709/229 |

OTHER PUBLICATIONS

HP Jetsend Technology Making Device–To–Device Communication Simple, hereinafter Jetsend, http://web.archive.org/web/1998012422330/www.jetsend.com/Backgrnder.html ( Jan. 24, 1998).*

The Jetsend Protocol, http://web.archive.org/web/19980124230258/www.jetsend.com/Whitepaper.html, Jul. 2, 1997.*

* cited by examiner

Primary Examiner—Cesar B. Paula

(57) ABSTRACT

A forms printing apparatus includes a web server having a forms solution for supporting forms generation and transmission via an information exchange protocol. The web server includes a control interface for generating and transmitting forms as electronic material. The apparatus includes a request initiating client machine having a web browser and a network connection with the web server. An output device of the apparatus is selected by a user and supports an information exchange protocol and a control interface for receiving forms transmitted from the web server and rendering user-perceptible forms.

21 Claims, 3 Drawing Sheets

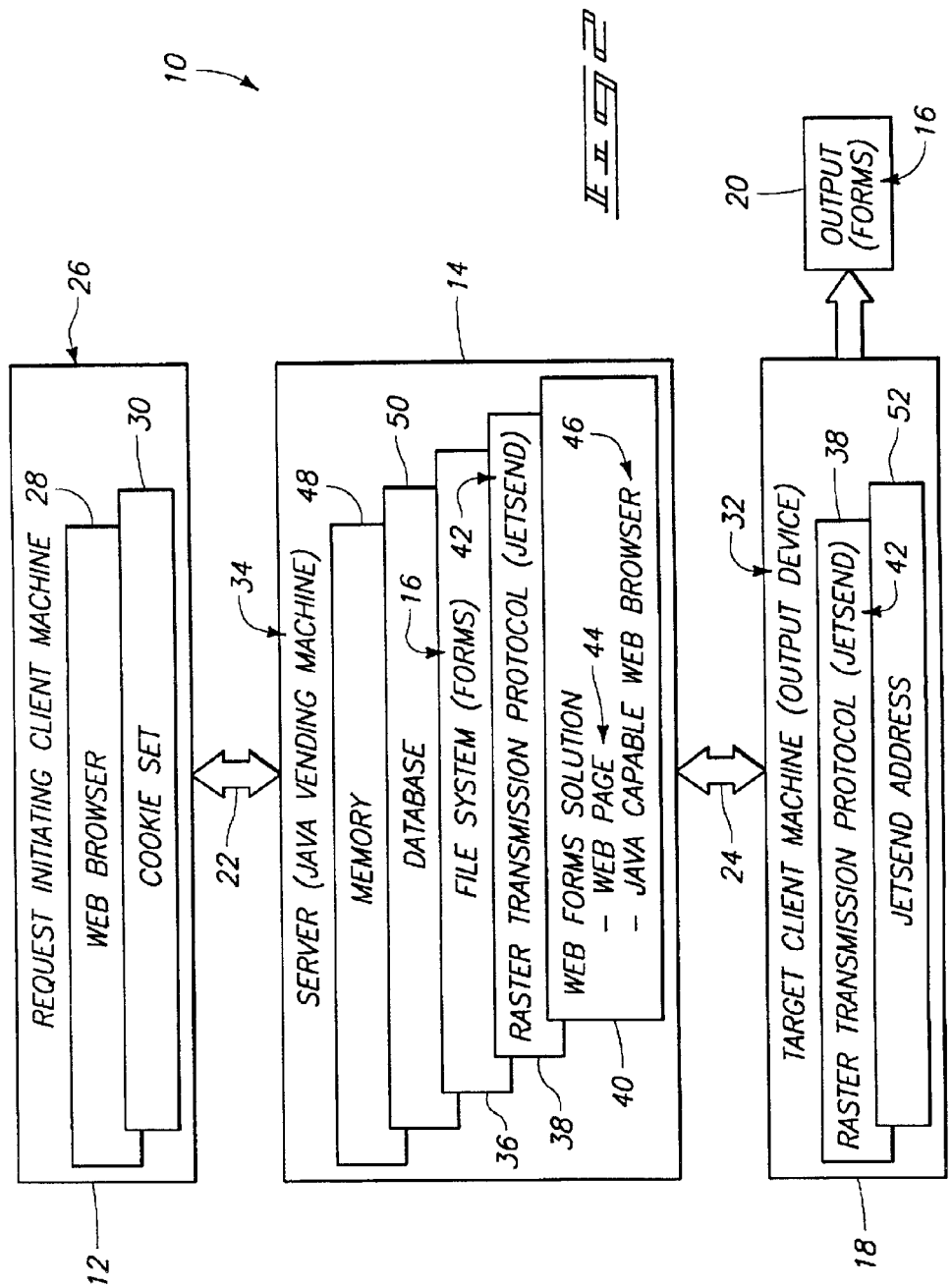

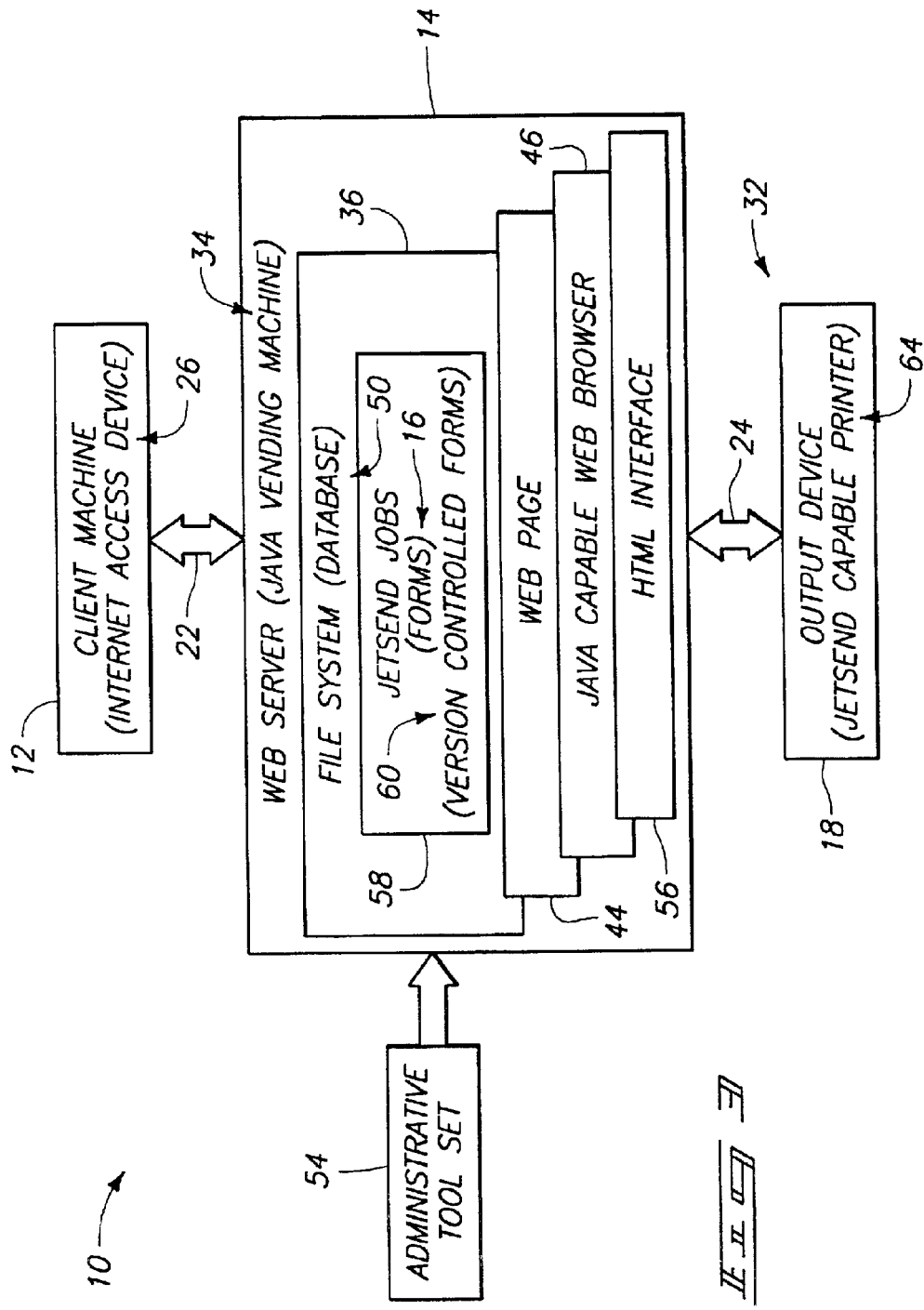

FORM PRINTING SOLUTIONS WEB SERVER USING A JAVA VENDING MACHINE FOR PULLING A JETSEND FORM PRINT JOB FROM A SERVER AND OUTPUTTING TO A DEVICE

FIELD OF THE INVENTION

This invention relates generally to a forms printing solution, and more particularly to a World Wide Web based client server application for distribution of forms through a server to a vending machine appliance having raster bit image capabilities, such as a Jetsend capable printer.

BACKGROUND OF THE INVENTION

Techniques for printing electronic forms through the World Wide Web are well known. One such technique involves the transfer of hypertext mark-up language (HTML) between devices over the World Wide Web (WWW). A series of HTML commands recognizable by a web browser are used to render a document. In the case of a form, such HTML commands are interpreted by different web browsers in slightly different manners. For example, Netscape Navigator will decide how much space to insert after a paragraph break HTML command "<P>" based upon characteristics internal to Netscape Navigator. Such decision is discretionary, based upon the specific Web browser. Internet Explorer will decide how much space to insert at the same paragraph break, with such decision oftentimes resulting in a different spacing than for Netscape Navigator. However, when printing forms that require precise spacing, such variation is unacceptable. For example, medical reimbursement forms oftentimes have boxes in which users insert information such as a doctor's name. Variations in size of such boxes, or organization within a page oftentimes will not prove exact enough. Web browsers can control font sizes and spacing of information through specification of general preferences. However, such general preferences are really designed to enhance viewing of such information on a computer screen and space/size such information to enhance user viewing, regardless of the screen being used. Most web-based document transmission is implemented in this manner. However, the document layout is not precise. Hence, HTML transmission of forms when web printing to remote web connected clients will not generate precise forms.

One technique for transmitting forms involves sending a word-processor-based document via a network from one client to another client, such as between two users over the Internet. For example, one type of word-processor-based document is Microsoft Word. The transfer and printing of a Microsoft Word document is one technique for exactly rendering forms. Microsoft Word documents are externally dependent on a common font being installed on both the request initiating and target client machines. Hence, Microsoft Word documents are not self-contained. Additionally, the common font must be called, or identified, with the same name by each machine. Furthermore, the font called out in the document must have the same binary definition on both machines, or computers. In addition, compatible versions of Microsoft Word need to be provided on both machines. Even furthermore, both machines have to be able to run Microsoft Word, i.e. the machines need to have compatible computer architectures and operating systems.

More particularly, the transfer of a Microsoft Word document in "Times Roman Bold" font requires the provision of such "Time Roman Bold" font on both the request initiating and target client machines. Generally, this transfer works when standard fonts are used. However, when less familiar and non-standard fonts are used problems can occur. Furthermore, it is possible that one client has a different bit image of the same font which can lead to variations in printed characteristics of the document or form.

Another technique involves the use of specialty software such as Adobe Acrobat. Adobe Acrobat is a page-rendering language wherein all of the information needed to transfer documents is encapsulated. Adobe Acrobat uses a Portable Document Format (PDF) file in the Acrobat document exchange system. Essentially, PDF files generally are self-contained, in contrast with Microsoft Word documents. However, such information has to be installed on the request initiating (or transmitting source) client machine as well as on the target (or receiving) client machine. Furthermore, Adobe Acrobat still has an external dependency in that support for Adobe Acrobat has to be provided on both machines. For example, the machines need compatible computer architecture and operating systems, and a copy of Adobe Acrobat has to be loaded onto the request initiating client machine and the target client machine. Each machine also requires binary executable storage, sufficient processing power and sufficient document storage.

The need to provide a copy of Adobe Acrobat on both the request initiating machine and the target client machine increases cost and complexity of the request initiating client machine. The request initiating client machine needs Adobe Acrobat to set up, generate and encapsulate the document. Such document is transmitted as a Portable Document File (PDF) file to the target client machine. The target client machine needs Adobe Acrobat to take the PDF file and generate such document from the encapsulated form. The target client machine pulls up Adobe Acrobat and runs the PDF file through Adobe Acrobat to generate the document for viewing and/or printing on the target client machine. For the case where a request initiating machine is a digital cellular telephone, a pager, a personal digital assistant (PDA), or some other relatively simple internet access device, the need to provide Adobe Acrobat will greatly increase cost and complexity by also adding to the hardware/software requirements of the appliance. For example, many personal digital assistants (PDAs) are not capable of supporting Adobe Acrobat.

Accordingly, Adobe Acrobat forms a fairly common helper application that generates and transmits documents in a relatively seamless manner, but requires additional storage capabilities, additional process capabilities, an application (Adobe Acrobat) to process on both the request initiating and target client machines, and requires that both request initiating and target client machines have supported hardware. For many simple internet access devices, such support is not available. For example, personal digital assistants (PDAs), generally do not support such functionality. Hence, such devices cannot support processing by the request initiating client machine which is required by Adobe Acrobat. If all an individual wants to do is remotely print a document, the request initiating client machine has to perform quite a few functions.

Therefore, there exists a need for a forms printing solution that enables the selection and distribution of a type of predetermined content via client machines having World Wide Web access capabilities. Furthermore, there exists a need to provide such capabilities even with machines forming appliances having very limited capabilities such as digital cellular telephones and personal digital assistants (PDAs).

SUMMARY OF THE INVENTION

One object of the invention is to enable selection and printing of desired forms from a web server to a selected one of several potential output devices with a simple client machine such as an internet access device.

Another object of the invention is to render user-perceptible forms that are dimensionally and graphically accurate irrespective of the output device used to print such forms.

Yet another object of the invention is to provide a Java vending machine containing selected forms for printing at identified output devices.

Even another object of the invention is to provide a tool set for assisting a customer site administrator in creating/maintaining a forms menu, and for controlling the versions of forms being accessed/distributed by selected users.

This invention features an apparatus and method usable as a World Wide Web based client server application for distribution of forms through a server to a vending machine appliance having raster bit image capabilities, such as a Jetsend capable printer. Such apparatus and method enables the use of appliances having very limited capabilities such as digital cellular telephones and personal digital assistants (PDAs) for sending form print requests to a print-capable client machine coupled via a web server and having a known web address.

According to one aspect of the invention, a forms printing apparatus includes a web server having a forms solution for supporting forms generation and transmission via an information exchange protocol. The web server includes a control interface for generating and transmitting forms as electronic material. The apparatus includes a request initiating client machine having a web browser and a network connection with the web server. An output device of the apparatus is selected by a user and supports an information exchange protocol and a control interface for receiving forms transmitted from the web server and rendering user-perceptible forms.

According to another aspect of the invention, a forms storage, retrieval and printing system includes a server. The server has a memory, a database defined in the memory, a forms solution for supporting forms generation and transmission, and a control interface for generating and transmitting forms as electronic material across a network interconnected with the server. The system includes a request initiating client machine having a browser and a network connection. An output device of the system is selected by a user and supports an information exchange protocol and a control interface for receiving forms transmitted from the web server and rendering user-perceptible forms.

According to yet another aspect of the invention, a method for selecting and printing forms remote from a user includes the steps of: accessing a web-capable server with a web-accessible client machine; selecting a form to be printed from a selection of forms stored on the server; selecting a web address of an output device for printing the selected form having an information exchange protocol and a control interface for receiving forms transmitted from the web server and rendering user-perceptible forms; and printing the rendered form at the output device.

DESCRIPTION OF THE DRAWINGS

Preferred embodiments of the invention are described below with reference to the following accompanying drawings depicting examples embodying the best mode for practicing the invention.

FIG. 2 is a schematic diagram illustrating the structure and operation of the forms storage, retrieval and printing system of FIG. 1 in accordance with one embodiment of this invention.

FIG. 3 is a schematic block diagram illustrating in further detail the structure and function of the apparatus and methods of FIG. 2.

DETAILED DESCRIPTION OF THE INVENTION

Figure 1:
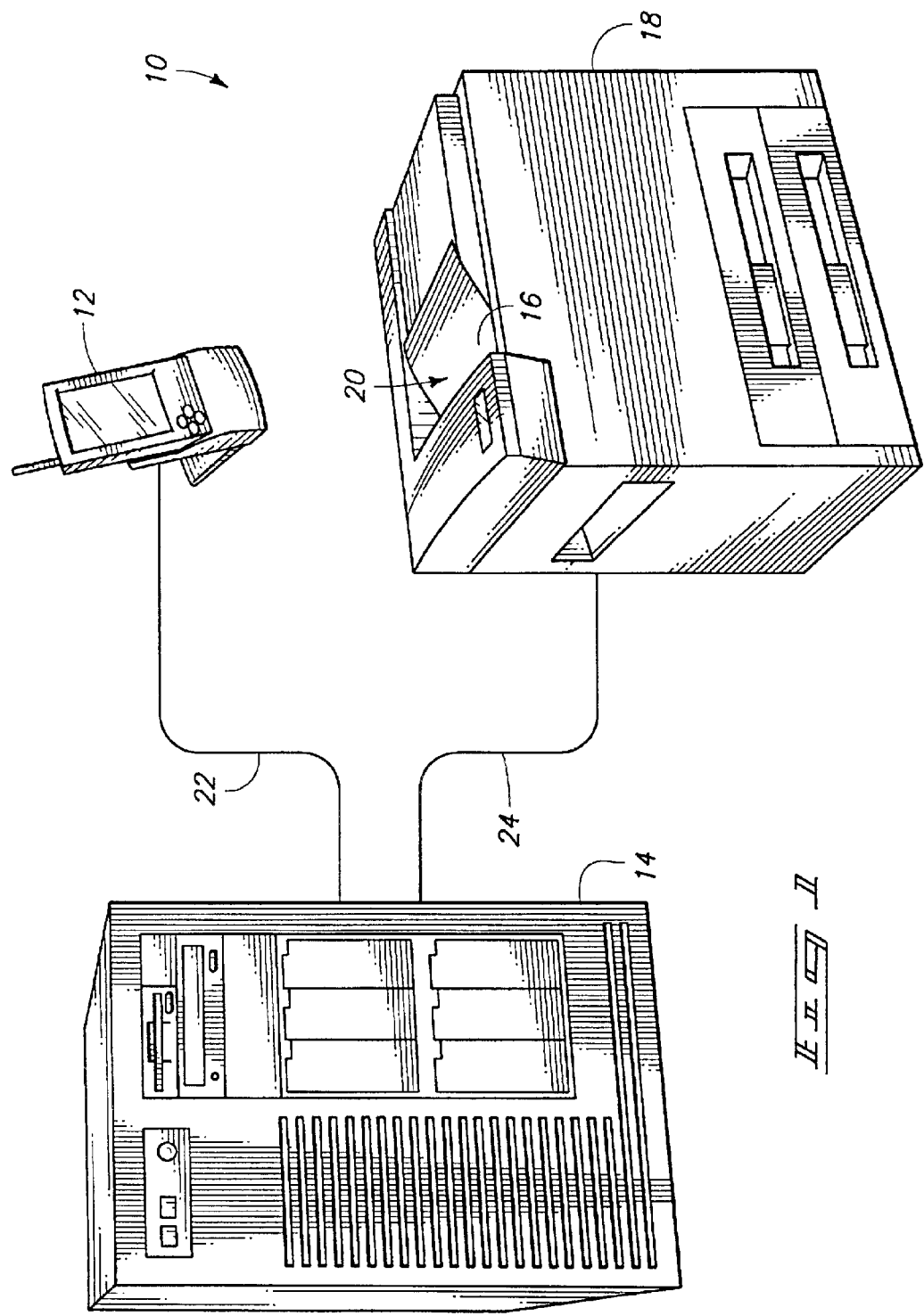
FIG. 1 is a simplified perspective view illustrating a forms storage, retrieval and printing system according to this invention.

This disclosure of the invention is submitted in furtherance of the constitutional purposes of the U.S. patent Laws "to promote the progress of science and useful arts". U.S. Constitution, Article 1, Section 8.

A "client" is a workstation or computer operating in a client/server environment. A client/server is an architecture in which the client is the requesting machine and the server is the supplying machine. The client serves to provide a user interface, and may perform some or all of the application processing. The server maintains databases and processes requests from the client to extract data from or update the database. Examples of a "client" include personal computers such as desktop, laptop, and notebook computers, personal digital assistants (PDAs), pen computers, digital cellular telephones having internet access capabilities, any form of internet access device, smart printers, facsimiles, document processing devices, multiple function peripheral (MFP) devices, etc.

"Jetsend is an information exchange protocol for fixed-function and programmable devices available from Hewlett Packard Company (HP). Jetsend comprises a surface interaction protocol wherein communication between devices takes place entirely via surfaces. The part of a device's state that can be connected is called its surface. Jetsend synchronizes the surfaces of connected devices. The device surfaces, which must contain the same kinds of information, consist of information that can be rendered perceptible to people by visual, audible or tangible means. Hence, Jetsend protocol packages and sends perceptible phenomena and changes of such phenomena. Jetsend encodings are referred to as electronic material. Jetsend is presently commercially available from Hewlett Packard of Palo Alto, Calif.

A "cookie" is a small piece of information which a web server can store temporarily with a web browser. A web browser is a program used to view documents on the World Wide Web. Hence, a browser can remember certain specific information which is useful for the browser to later retrieve. For example, "on-line shopping malls" contain "shopping carts" that allow you to browse through content on a website. A user can add items to the "shopping cart" while they browse. A list can then be generated of items that have been picked up so that all the items can be paid for all at once when you are finished shopping. As you browse various websites, servers send cookies to the user's web browser which are stored by the user's computer memory.

Java is a programming language for World Wide Web applications, from Sun Microsystems. Java programs are embedded into HyperText Markup Language (HTML) documents.

A Java vending machine is a web server having a file system containing Jetsend capabilities, including Jetsend jobs. Additionally, Applicant's Java vending machine includes a web page, and requires a Java-capable web browser and an HTML interface.

"Forms" are documents having blank spaces to be filled in, or documents having an orderly arrangement of textual and/or graphical material.

FIG. 1 illustrates one embodiment of Applicant's invention in the form of a Web based client server application depicted as a forms printing apparatus indicated by reference numeral 10. Apparatus 10 comprises a forms printing solution that includes a forms storage, retrieval and printing system. System 10 provides a powerful, flexible, easy and cost-effective solution for printing forms. The time associated with developing specific forms, and for printing and distributing such forms is greatly minimized. Additionally, system 10 is open and extensible, making it capable of running on most computer systems.

Traditionally, forms have been generated for a specific use, then prepared by a print shop in large quantities. Typically, printed forms are ordered in large quantities to save costs and are stored where they are used and made available to users. However, such forms oftentimes become outdated long before they are ever used, as forms often require updating and/or revision. Hence, system 10 provides a web based distribution system for delivering forms to a desired destination. Furthermore, such forms are delivered to hard copy devices in a manner that is not dependent upon the particular characteristics of the hard copy device.

According to one construction, system 10 comprises a World Wide Web based forms printing solution that is able to distribute forms to one of several output devices. Additionally, system 10 can be implemented with version controlled forms that enable a system administrator to control the distribution attributes of different forms through a web server. A web server is a web site, or a server on the Internet that contains World Wide Web documents.

As shown in FIG. 1, the forms storage, retrieval and printing system 10 includes a request initiating client machine 12 operative for accessing a web-based network server 14, selecting a form 16 to be printed from server 14, and enabling transfer of such form from server 14 to another target client machine 18 where form 16 is generated as output 20. As shown in FIG. 1, client machine 12 comprises a personal digital assistant (PDA). Optionally, client machine 12 can be formed from any machine having a web browser and internet access capabilities including appliances having very limited capabilities such as digital cellular telephones and personal digital assistants (PDAs), portable computers, portable electronic devices, and digital pagers.

Network server 14 comprises a web based server on which a selection of potentially desired forms are stored, modified, and maintained for access from client machine 12 and delivery to client machine 18.

Client machine 18 comprises an output device supporting an information exchange protocol with network server 14. More particularly, client machine 18 comprises a target Jetsend printer having a control interface for receiving selected and delivered forms from server 14 for rendering user-perceptible forms 16 that are printed as output 20. Optionally, client machine 18 can be formed by any device supporting an information exchange protocol such as Jetsend, for example, a facsimile machine, a multiple function peripheral (MFP) device, a document center, any hard copy device, a kiosk printer, etc.

Form 16 comprises any document containing textual and/or graphical information. For example, form 16 can include one or more of insurance forms, medical forms, applications, questionnaires, specification sheets, graphics rich documents, tax returns, State and Federal Government agency forms such as forms for filing and/or prosecuting a patent application with the U.S. patent and Trademark Office. Form 16 can include any document containing blank spaces to be filled in, requiring a user to add additional information into the form such as into a box or onto a blank line corresponding to content printed onto the form. Additionally, form 16 can include any document having an orderly arrangement of textual and/or graphical information.

According to the implementation depicted in FIG. 1, a first network connection 22 is provided between client machine 12 and network server 14. A second network connection 24 is also provided between network server 14 and client machine 18. In one form, network connection 22 is an internet connection provided via a hardwired telephone line (ISDN). Optionally, network connection 22 can be formed as an intranet connection. Further optionally, network connection 22 can be a fiber optic cable connection, or wireless connection including radio frequency (RF) connections, infrared (IR) connections, microwave connections, satellite communication connections, or any other type of suitable network connection.

FIG. 2 illustrates in greater detail the structure and operation of a forms storage, retrieval and printing system in accordance with the embodiment depicted in FIG. 1. More particularly, request initiating (or transmitting) client machine 12 is shown as an internet access device 26 including a web browser 28 and a cookie set 30. Web browser 28 comprises a Java-capable web browser. Netscape Navigator 3 comprises one suitable web browser 28. Internet Explorer 3.0 comprises another suitable web browser 28. Cookie set 30 is used by device 26 to inform the web server 14 where to send a user selected/requested form 16. For example, where there exists more than one Jetsend capable output device 32, a user can designate the Jetsend address of such device 32 and request that a selected form be forwarded by server 14 for printing on output device 32.

According to other configurations of Applicant's invention, multiple request initiating client machines can be provided. Additionally, multiple target client machines 18 can also be provided. It is also possible that request initiating client machine 12 and target client machine 18 are one and the same machine. For example, such machine can comprise a Jetsend capable personal computer (PC) coupled with a printer that need not be Jetsend capable. Accordingly, a user can select form 16 via such Jetsend capable personal computer (client machine 12) and forward such selected form 16 to the same machine, where it is then selected and printed through the Jetsend capable personal computer to the associated printer.

For purposes of Applicant's invention, a request initiating client machine comprises a web browsing apparatus. Similarly, a target client machine comprises any device capable of making a form user perceptible.

Network server 14 is shown as a web server configured as a Java vending machine 34 having a file system 36 containing individual forms 16. Server 14 is configured with a raster transmission (or information exchange) protocol 38 and a web forms solution 40. One suitable raster transmission protocol comprises Jetsend 42. Web server 14 also includes a control interface for generating and transmitting forms 16 as electronic material. Web forms solution 40 includes a web page 44 provided by server 14 on the World Wide Web, and a Java capable web browser 46 such as Netscape Navigator 3 or Internet Explorer 3.0. Server 14 also includes memory 48 and a database 50. In one form, database 50 comprises file system 36 on which individual forms 16 are stored and maintained.

Target (or receiving) client machine 18 is shown as a Jetsend capable hard copy output device 32. More particularly, output device 32 is configured to operate with an information exchange protocol in the form of a raster transmission protocol 38. According to one implementation, such raster transmission protocol 38 comprises a Jetsend protocol device 42. Output device 32 has a Jetsend address 52 which is used by transmitting client machine 12 and server 14 to identify where a selected form 16 is to be printed. Web server 14 transmits a selected form 16 directly to the selected Jetsend capable output device 32 as discussed below in greater detail with reference to FIG. 3.

Output 20 is shown as a selected form 16 that is printed out by output device 32 which is rendered in a user-perceptible form having content and spacing corresponding with the state that form 16 takes when resident within server 14. Form 16 is selected by a user of request initiating client machine 12.

As shown in FIG. 3, forms storing, reproducing and printing system 10 is depicted in even greater detail. Web server 14 is illustrated in greater detail. Additionally, an optional administrative tool set 54 is shown for assisting a customer site administrator in creating/maintaining a form menu for selecting forms, and for creating/maintaining specific forms 16 that are accessible on web server 14. Tool set 54 is run and accessed as a client machine. As discussed in greater detail below, capabilities can also be given to a customer site administrator to control the versions of forms accessible by or distributed to particular users.

Web server 14 forms a Java vending machine 34. Such machine 34 includes file system 36, web page 44, Java capable web browser 46, and an HTML interface 56. HTML interface 56 forms a control interface. Java vending machine 34 comprises file system 36 containing a database 50 of individual selectable Jetsend jobs 58. Each Jetsend job 50 comprises specific forms 16 that can be selected by a user of client machine 12 for printing on output device 32. Optionally, version controlled forms 60 can be provided by a user of administrative tool set 54. Forms 60 are tailored for selective user access via administrative tool kit 54 by a customer site administrator.

Web page 44 of web server 14 comprises a page in a World Wide Web document.

HTML interface 56 comprises an interconnection between the hardware, software and a user for establishing links between documents and the World Wide Web. HTML interface 56 is used to browse and select desired or selected forms 16. Furthermore, HTML interface 56 is used to set cookies which determine an address 52 (see FIG. 2) where a selected form 16 is to be sent for printing at an output device 18.

Version controlled forms 60 are optionally provided for certain customers. Version controlled forms 60 are configured so as to keep Jetsend jobs in a Clearcase Version Object Base (VOB). Clearcase is sold by Rational Software, 20 Maguire Road, Lexington, Mass. Clearcase VOB provides version control for electronic forms databases such that a user can version the database. For example, a system administrator can take a database of versions and access the versions as a file system. Such implementation allows an application to think that the versions are files, presenting a certain version as a specific file. Version controlled forms 60 further start the web server 14 in a Clearcase View. A configuration specification is set in order to control the versions that are being distributed to specific users.

In order to implement Applicant's invention, web server 14 requires a minimum capability of an NT Server. Optionally, a more robust server in the form of a Enterprise Class Unix Server can also be used.

According to Applicant's invention, data replication and/or multiple site capabilities can also be provided. Such implementation can be managed by using version controlled form 60 as a version control option, and replicating data with a Clearcase Multi-site Product, sold by Rational Software.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A printing apparatus, comprising:
   a web server having a forms printing solution for supporting version controlled forms generation and transmission via an information exchange protocol and a control interface for generating and transmitting forms as electronic material;
   a request initiating client machine comprising a personal digital assistant having a web browser and a network connection with the web server; and
   an output device comprising a surface-interaction protocol capable printer selected by a user and supporting an information exchange protocol and a control interface for receiving forms transmitted from the web server and rendering user-perceptible forms;
   wherein the web server comprises a Java vending machine, the Java vending machine operative to pull a user selected Jetsend job from a server file system and transmit the Jetsend job to a user selected Jetsend output device.

2. The apparatus of claim 1 further comprising an administrative tool set.

3. The apparatus of claim 2 wherein version controlled forms are provided by a user of the administrative tool set.

4. The apparatus of claim 1 wherein the web server forms solution comprises a Java capable browser implemented via a web page to generate desired form.

5. The apparatus of claim 1 wherein the network connection comprises an internet connection between at least one of the client machine and the web server, and the output device.

6. The apparatus of claim 1 wherein the information exchange protocol comprises Jetsend, and the output device comprises a Jetsend capable hard copy output device.

7. The apparatus of claim 1 wherein the web server further comprises an HTML interface operative to generate and store a cookie on the web browser of the client machine, the cookie containing specific information detailing a user selected form to be printed and a network address for the output device selected to generate the form.

8. The apparatus of claim 1 wherein the request initiating client includes a cookie set used to inform the web server where to send a user identified form.

9. The apparatus of claim 1 wherein the output device comprises a printer having a surface-interaction protocol address.

10. A forms storage, retrieval and printing system, comprising:

a server including a memory, a database defined in the memory, a forms printing solution for supporting forms generation and transmission, and a control interface for generating and transmitting forms as electronic material across a network interconnected with the server;

a request initiating client machine comprising a personal digital assistant having a browser and a network connection;

an output device selected by a user and supporting an information exchange protocol including a surface-interaction protocol and a control interface for receiving forms transmitted from the web server and rendering user-perceptible forms;

wherein the server comprises a Java vending machine, the Java vending machine operative to pull a user selected Jetsend job from a server file system and transmit the Jetsend job to a user selected Jetsend output device.

11. The system of claim 10 wherein the network comprises a World Wide Web.

12. The system of claim 10 wherein the client comprises an interface access device.

13. The system of claim 10 wherein the output device comprises a receiving client machine.

14. The system of claim 10 wherein the control interface comprises a Raster transmission protocol.

15. The system of claim 10 further comprising an administrative tool set configured to enable a user to create and/or maintain specific forms that are accessible on the server.

16. The system of claim 10 wherein the request initiating client machine further comprises a target client machine, and wherein the output device comprises the target client machine.

17. A method for selecting and printing forms remote from a user, comprising:

accessing a web-capable server with a web-accessible client machine comprising a personal digital assistant;

selecting a form to be printed from a selection of forms stored on the server;

selecting a web address of an output device for printing the selected form having an information exchange protocol and a control interface for receiving forms transmitted from the web server and rendering user-perceptible forms; and printing the rendered form at the output device;

wherein the step of selecting an output device web address and a form to be printed comprises the step of storing the web address and the form temporarily within a cookie of the client machine, and transmitting the cookie to the web server.

18. The method of claim 17 wherein the client machine comprises a Java-capable web browser and a cookie set, the output device comprises a surface-interaction protocol device, and the server comprises a Java vending machine and further comprising informing the web-capable server via the cookie set where to send a user identified form.

19. A printing apparatus, comprising:

a web server having a forms printing solution for supporting version controlled forms generation and transmission via an information exchange protocol and a control interface for generating and transmitting forms as electronic material;

a request initiating client machine comprising a personal digital assistant having a web browser and a network connection with the web server; and an output device comprising a surface-interaction protocol capable printer selected by a user and supporting an information exchange protocol and a control interface for receiving forms transmitted from the web server and rendering user-perceptible forms, wherein respective ones of the user-perceptible forms rendered by the output device have content and spacing corresponding with a state of the respective ones of the user-perceptible forms when resident within the web server;

wherein the web server comprises a Java vending machine, the Java vending machine operative to pull a user selected Jetsend job from a server file system and transmit the Jetsend job to a user selected Jetsend output device.

20. A forms storage, retrieval and printing system, comprising:

a server including a memory, a database defined in the memory, a forms printing solution for supporting forms generation and transmission, and a control interface for generating and transmitting forms as electronic material across a network interconnected with the server;

a request initiating client machine comprising a personal digital assistant having a browser and a network connection;

an output device selected by a user and supporting an information exchange protocol including a surface-interaction protocol and a control interface for receiving forms transmitted from the web server and rendering user-perceptible forms, wherein respective ones of the user-perceptible forms rendered by the output device have content and spacing corresponding with a state the respective ones of the user-perceptible forms take when resident within the web server;

wherein the server comprises a Java vending machine, the Java vending machine operative to pull a user selected Jetsend job from a server file system and transmit the Jetsend job to a user selected Jetsend output device.

21. A method for selecting and printing forms remote from a user, comprising:

accessing a web-capable server with a web-accessible client machine comprising a personal digital assistant;

selecting a form to be printed from a selection of forms stored on the server;

selecting a web address of an output device for printing the selected form having an information exchange protocol and a control interface for receiving forms transmitted from the web server and rendering user-perceptible forms; and printing the rendered form at the output device, the rendered form having content and spacing substantially similar to a state of the rendered form when resident within the web server;

wherein the step of selecting an output device web address and a form to be printed comprises the step of storing the web address and the form temporarily within a cookie of the client machine, and transmitting the cookie to the web server.

* * * * *